May 20, 1941.　　H. C. BOSTWICK　　2,242,810
STOCK FEEDER
Filed Dec. 10, 1937　　3 Sheets-Sheet 1
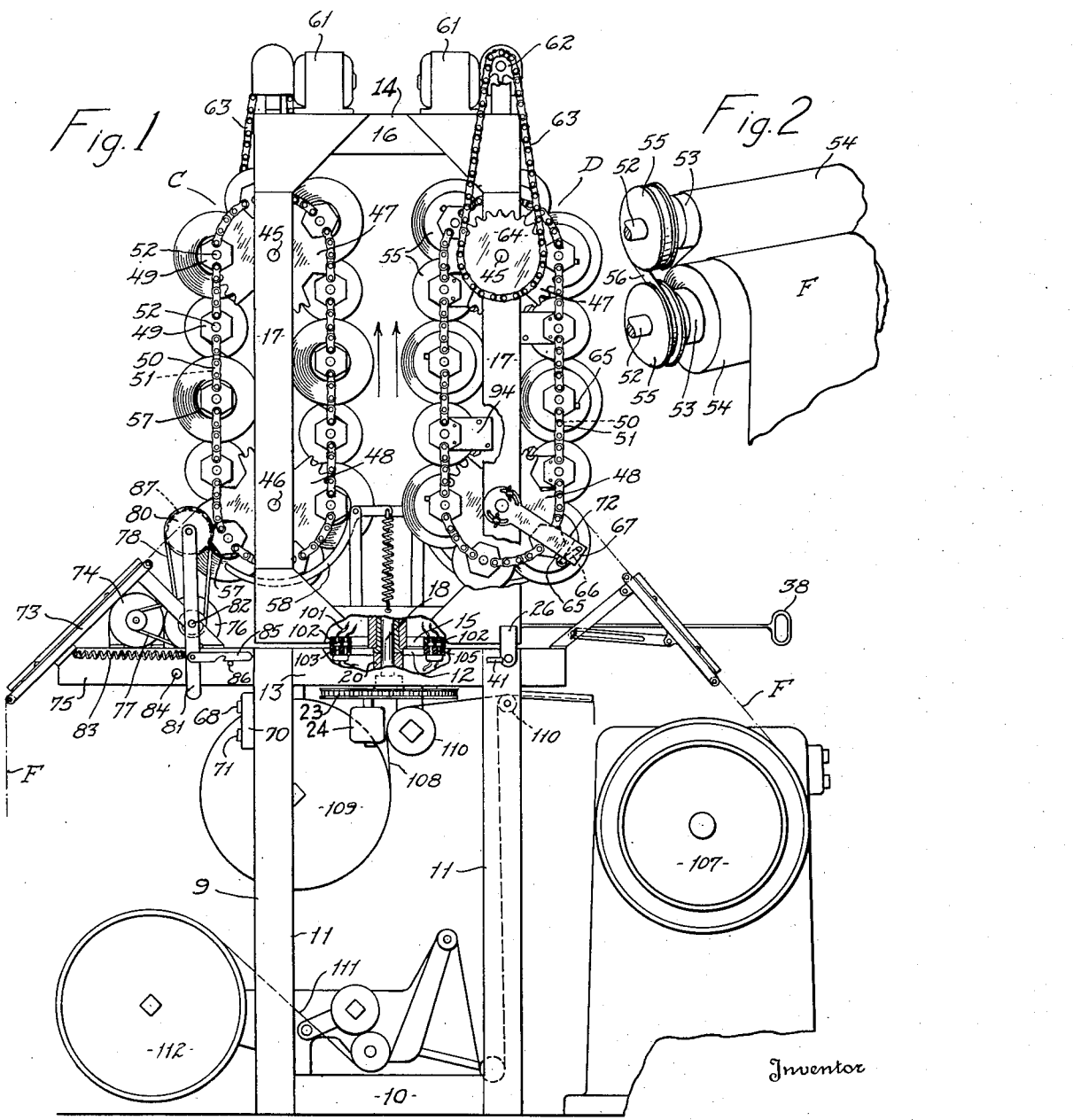
Inventor
HENRY C. BOSTWICK
By Bates, Goldrick, & Teare
Attorneys May 20, 1941. H. C. BOSTWICK 2,242,810
STOCK FEEDER
Filed Dec. 10, 1937 3 Sheets-Sheet 2
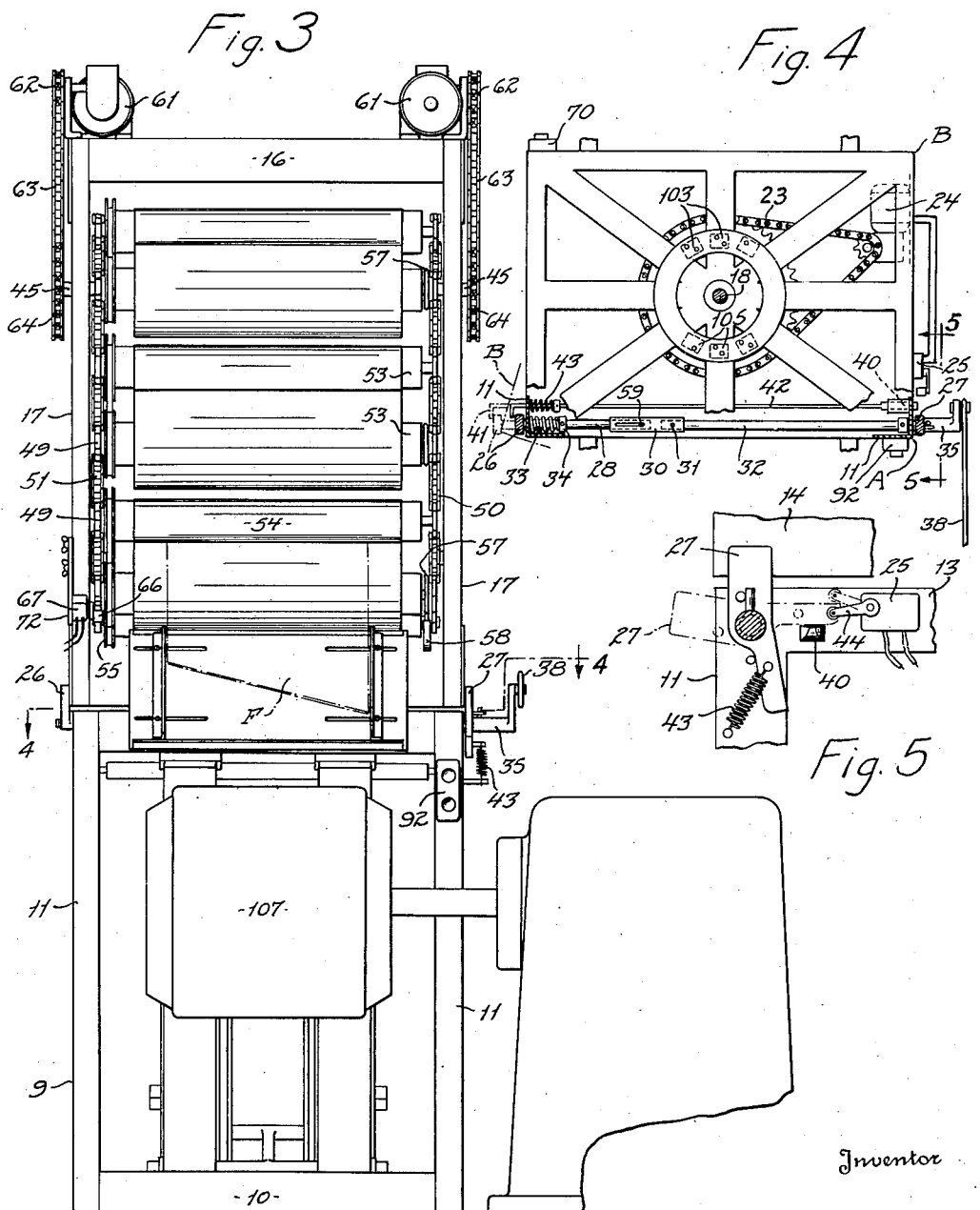
Inventor
HENRY C. BOSTWICK
By Bates, Gohrick, & Teare
Attorneys May 20, 1941.   H. C. BOSTWICK   2,242,810
STOCK FEEDER
Filed Dec. 10, 1937   3 Sheets-Sheet 3

INVENTOR.
HENRY C. BOSTWICK
BY Bates, Goldrick & Teare
ATTORNEYS

Patented May 20, 1941

2,242,810

UNITED STATES PATENT OFFICE 2,242,810

STOCK FEEDER

Henry C. Bostwick, Akron, Ohio, assignor to Akron Standard Mold Company, Akron, Ohio, a corporation of Ohio Application December 10, 1937, Serial No. 179,119

6 Claims. (Cl. 154—10)

This invention relates to strip-feeding apparatus for tire-building machines generally, but it is more particularly concerned with tire-building machines of the type adapted to build semi-flat or drum built tire carcasses.

The primary object of my invention is to provide an improved stock turret for tire-building machines which will result in increased speeds of such machines and thereby enable an operator to produce a greater number of tires in a given time. Machines made in accordance with my invention can be stocked at the loading or charging end of the machine much faster than the stock is used at the unloading or discharge end. The stock turrets of such machines may therefore be charged by one attendant whose duties are to stock several machines.

Further objects of my invention are to be found in the novel construction and arrangement of the stock turret; the means for controlling the operation of the turret; and the method of charging or loading one unit of the turret with strip stock while simultaneously unloading or withdrawing other stock from a precharged unit of the turret.

Still another object of my invention resides in the improved and novel electrical controls for the various motors employed for operating the turret, and the new mechanism and devices employed for rotating or indexing the turret frame and associated strip stock storing and feeding units carried thereby.

Other objects and advantageous features of my invention will become apparent as the description proceeds.

Figure 6:
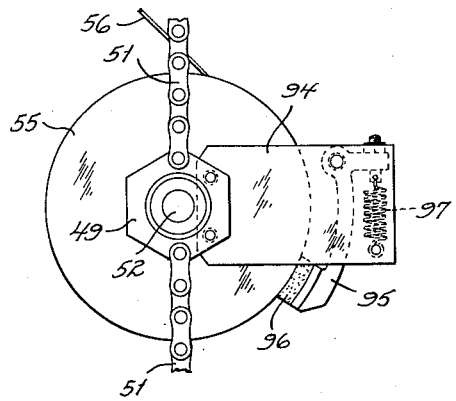
Figure 7:
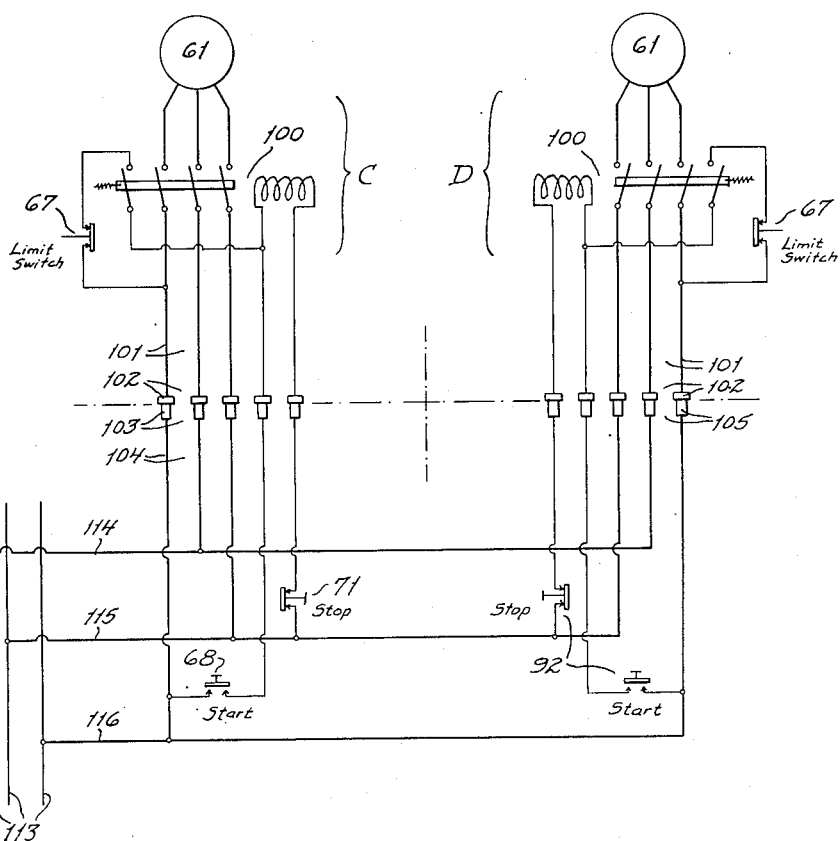

In the drawings, wherein like reference characters and numerals represent like parts throughout the several views, and in which: Fig. 1 is a side elevational view of a tire-building machine of the drum type, including a strip stock turret and controls therefore, made in accordance with the present invention; Fig. 2 is a fragmentary isometric view of one pair of the strip stock storing and feeding rolls carried by the turret; Fig. 3 is an end elevation of Fig. 1, looking towards the unloading end of the machine; Fig. 4 is a horizontal cross-section of Fig. 3 on a plane indicated by the lines 4—4 to illustrate the motor and the associated mechanism for rotating or indexing the stock turret; Fig. 5 is an enlarged detail view of one of the turret dogs or stops and the electrical switch actuated thereby for controlling the turret indexing motor; Fig. 6 is an enlarged end elevation of one of the flanged pulleys associated with the stock rolls to illustrate one of the several brake devices for tensioning the strip stock as it is withdrawn from said rolls; and, Fig. 7 is a schematic view illustrating the wiring diagram, motors and controllers for independent control of the stock turret units, relative to the loading and unloading stations of the tire-building machine.

In the accompanying drawings I have shown a tire-building machine in which a stock receiving turret or strip feeder is preferably mounted for rotation upon a support or main frame. In the present instance, a plurality of pairs of strip storing and delivery rolls are carried by the turret frame and mounted for movement in an endless path, the arrangement being such that when the stock rolls positioned adjacent the discharge or unloading end of the machine are exhausted of strip stock, the turret may be rotated or indexed to present another unit of loaded or charged rolls to this unloading station, while the unit of exhausted rolls is moved to a loading or charging station where they may again be filled with strip stock.

The tire-building machine herein shown preferably comprises a support or main frame 9 which consists of a base 10 supplied with upright standards or members 11, the upper ends of which support an apertured top plate 12 having depending walls or side flanges 13 which are welded or otherwise securely fastened to the uprights, and in this manner the main support or framework of the machine is fabricated.

Mounted above the support or main frame is a second support 14 hereinafter referred to as the stock-turret frame. This turret frame preferably consists of a bottom plate member 15, a top plate member 16, and vertical standards or upright members 17 which support the plate members in spaced apart relation relative to one another. The turret frame is mounted for rotation on the main frame preferably by means of a pivot shaft 18 which is carried by the turret frame and is adapted to turn in a bearing 20 on the top plate 12 of the main frame. The turret may be rotated by suitable driving linkage, preferably the sprocket chain 23, which is driven by a motor 24, carried by the main frame, the motor being energized from a source of supply through the switch member 25.

It may be desirable to retain the turret frame in various indexed positions to which it may be rotated upon the main frame, to insure proper alignment of the strip storing and feeding roll units as they are brought to rest adjacent their respective charging and discharging stations duing operation of the machine. One means for accomplishing this purpose may comprise a pair of locking dogs or stops 26 and 27, supported by the main frame and mounted for movement into and out of the path of the turret frame, as illustrated for example, in Figs. 3, 4 and 5 respectively. As shown in Fig. 4, stops 26 and 27 are preferably fast upon the outer ends of shafts 28 and 32 respectively, whose inner ends are telescopically received by a sleeve 30 fixed, as for instance by a pin 31, to the inner end of a shaft 32. The construction is such that the sleeve is supplied with a longitudinal slot to receive a pin 59 carried by the shaft 28, and in this manner the shafts can be rocked in the members 11 simultaneously but at the same time permitted to move axially relative to one another. One means for rocking the shafts may comprise an L-shaped arm 35 fast upon the outer end of shaft 32 and actuated by a handle or lever 38 the outer end of which is preferably located adjacent the discharge station of the machine so as to be readily operated by the attendant in charge of such machine.

It follows therefore that to unlock the turret frame to permit its rotation upon the main frame, an attendant at the discharge station of the machine merely pulls outwardly upon the handle 38 thereby rocking the shafts 28—32 which in turn move the stops 26—27 to unlocked position. The handle may be held in a forward position until after the corner designated A of the turret frame, for example, has passed the stop 26 and then it is returned to again set the stop into the path of the approaching part or corner of the turret designated B. The stop 27, however, must permit the corner B to pass, and it is therefore preferably loose on the shaft 32 between the arm and member 11 and held in the position illustrated by broken lines (Fig. 5) by a latch member 40 mounted for horizontal movement in the main frame and parallel to the shafts 28—32. As the corner B contacts the stop 26, the latter is moved outwardly to the dotted line position thus sliding the shaft 28 axially within the sleeve and compressing the spring 33. The spring may encircle its shaft and be confined between the member 11 and a collar 34 on the shaft. This outward movement imparted to the stop in turn engages the stop with the portion 41 of latch arm 42 and thereby withdraws latch 40 against the yieldable action of the spring 43 carried by the arm 42. The stop 27, when held in the locked position by latch 40, energizes the motor 24 by tripping the switch arm 44 of the switch member 25, as illustrated by broken lines in Fig. 5. Consequently, the release of switch arm 44 will actuate the switch 25 to sever the electrical circuit of motor 24 thus stopping the rotation of the turret frame, which is again locked or retained by the stops. It will be understood from the foregoing description that to index or rotate the turret upon its pivot shaft by power, it is only necessary to pull outwardly upon the handle and then return it to normal position, which movement actuates the stops and in turn controls starting and stopping of motor 24 through the switch 25.

Strip supply units

The present invention contemplates the provision of a plurality of strip supply units carried by the turret frame, and each unit having a plurality of pairs of stock storing and feeding rolls so constructed and arranged as to be shiftable as a unit to present pairs of stock storing rolls successively to a predetermined point adjacent the loading or unloading stations of the machine. For the sake of simplicity only two of such units are shown and are designated as a whole by reference letters C and D, it being understood that a larger number of such units may be employed if desired without departing from the spirit of my invention. These units are preferably arranged and supported within the turret so that an attendant at the charging station may be supplying one unit with strip stock, while an operator at the discharging station is withdrawing stock from a previously charged unit during the process of building tire carcasses.

Referring now to Fig. 1, the stock unit C is illustrated as occupying the charging station of the machine. This unit may comprise horizontally disposed shafts 45—46 mounted for rotation within suitable bearings in two of the turret standards. A pair of spaced apart segmental sprocket wheels 47 on the upper of said shafts are preferably driven in unison with a similar pair of sprocket wheels 48 on the lower shaft in any suitable manner, as for example, by chains 50 and 51 (Fig. 3) trained over the sprockets 47—48 respectively. Each chain may support a plurality of bearing blocks 49 spaced from one another, the blocks of one chain being preferably opposite the blocks of the other chain. The blocks may rotatably support shafts 52 each of which carries a stock roll 53.

An elongated tape or belt 54 is provided for each pair of rolls and is so arranged that as it is unwound from one roll it is wound upon the other so that a strip of stock F may be carried between its turns. To insure and maintain a uniform turning of each pair of rolls, to keep slack out of the belt as it is wound from one roll to the other, flanged pulleys 55—55 may be provided to receive a spring tape 56 the construction of which is clearly explained in my United States Patent No. 1,952,904.

To rotate the respective pairs of rolls, each of the shafts 52 is provided with a friction wheel 57, which is adapted to be engaged by a swingable power-driven friction wheel 87, which will hereinafter be more fully described.

To increase the speed with which the stock storing units such as C and D may be stocked with strips of fabric F, I prefer to rotate such units in an endless path by power, but do not wish to be understood as limiting myself to the movement of the units in an endless path, as many other forms may be employed to successively present the stock rolls of such units to any desired predetermined point without departing from the spirit of my invention. Such a power means may comprise for example, an electric motor 61 mounted upon the top plate of the turret frame. A pinion 62, driven by the said motor may in turn drive a chain 63, which is trained over a sprocket 64 mounted on a shaft 45 which projects beyond the outside of the turret frame as shown in Fig. 3. It will therefore be apparent that whenever the motor is running, the shaft 45 will be rotated which in turn rotates sprocket wheel 47—48, chains 50—51 and the several pairs of rolls 53—53.

To successively stop the pairs of rolls adjacent the in-feed table 73 automatic means such as a limit switch may be employed to sever the circuit of motor 61. Such mechanism may comprise an outwardly projecting lug or finger 65 carried by alternate blocks 49 adjacent one end of the rolls 53, which successively engages a switch arm 66 (Fig. 1) of a limit switch 67 which latter is contained in the electrical circuit of the motor. The switch may be adjustably mounted as for example on an arm 72 which is adjustably supported by one of the turret frame standards. This adjustment may be provided in order to stop the rolls at the desired position adjacent the in-feed table 73. As shown in Fig. 1 the motor 61 may be started by depressing button 68 of a switch 70 mounted adjacent the charging station of the machine. It will therefore become apparent that an attendant feeding strips of fabric stock F between the rolls of unit C merely depress button 68 to start the motor 61 whereupon the rolls will be advanced until actuation of the limit switch takes place to stop the rotation of the rolls thus bringing an empty pair of rolls adjacent the in-feed table 73.

After an empty set of rolls is stopped adjacent the in-feed table 73 an attendant may charge said rolls with a strip or strips of tire fabric F by inserting one end of the fabric between the rolls, the fabric being supported as it is wound upon the rolls by the in-feed table 73. After the end of the strip F is inserted between the rolls the next step in charging the unit is to rotate the rolls which may be attained by power means as, for example, a motor 74, suitably mounted upon horizontally extend-member 75 attached to the main frame and arranged to drive a pulley 76 through a belt 77 the pulley in turn driving a second pulley 80, as, for example, by a second belt 78. As shown in Fig. 1, the pulley 80 may be rotatably mounted upon the upper end of a swingable arm or lever 81 which may be pivotally mounted midway its ends as at 82 and having its upper end normally urged towards the turret frame as by a spring 83. The inward movement of the upper end of said lever is limited by a stop pin 84 and the lever is preferably supplied with a latch 85 having a notch therein to receive a pin 86 when the lever is swung counter-clockwise upon its pivot 82 as viewed in Fig. 1. The pulley 80 is preferably supplied with a friction wheel 87 which is in alignment with the friction wheel 57 one of the latter being furnished for each pair of rolls. It follows, therefore, that after the starting end of fabric F is manually inserted between the stock storing and feeding rolls, it is wound between said rolls simply by releasing the latch 85, whereupon the spring 83 causes the engagement of the friction wheels 57—87 whereupon the lower roll of the pair of rolls is rotated in a clockwise direction as viewed in Fig. 1, this clock-wise rotation in turn imparting a counter-clock-wise rotation to the upper roll through the belt 54, which during the charging operation is wound upon the lower roll and unwound from the upper roll. This causes the fabric material F to be wound upon the lower roll between the turns of the belt 54.

When a sufficient length of the fabric material F is wound between the rolls in the manner just described, the attendant at the charging station moves lever 81 in a manner to separate the friction wheels 87—57 thus stopping rotation of the rolls and winding of the fabric material therebetween, to permit the attendant to sever on a bias the fabric material as illustrated in Fig. 3. This leaves a portion of the fabric strip F still to be wound between the rolls and this loose end, so to speak, may be automatically wound between the rolls as they are advanced by the motor 61 in a manner heretofore explained, to present the succeeding pair of empty rolls adjacent the in-feed table 73.

One mechanism which may be employed for automatically winding up this loose end of the fabric between the rolls may comprise a curved track 58 arranged to engage the friction wheel 57 thus imparting the same direction of rotation to said wheel that was just previously imparted thereto by the friction wheel 87. In this manner, the attendant at the charging station of the machine may quickly and conveniently charge one pair of rolls after another until the entire unit C is fully stocked with fabric strip material. The construction of unit D in the present showing is a duplication of that described in connection with unit C and therefore the same reference numerals have been applied to corresponding parts. When each pair of supply rolls of unit C has been fully charged with fabric material and the supply rolls of unit D have become exhausted the attendant adjacent the discharging station can rotate the turret frame through the actuation of handle 38 heretofore explained, to bring the fully charged unit C to the discharging station and present the exhausted unit D to the charging station.

When an attendant is withdrawing the fabric material from between the rolls at the discharging station of the machine it is desirable that the fabric be maintained under uniform tension. This may be accomplished by mechanism which is illustrated in detail in Fig. 6. As here shown, alternate bearing blocks are supplied with outwardly projecting plate members 94 which pivotally support brake arms 95 the lining 96 of which is held against the outer periphery of the flange pulleys 55 by spring 97 as shown. It is only necessary to brake one of the flange pulleys 55 as the braking action will be transmitted to the other flange pulley of the pair through the spring tape 56.

Referring now to the wiring diagram in Fig. 7, the control of motors 61 for the units C and D is as follows: Assuming that the unit C is at the charging station of the machine and the unit D is at the discharging station as illustrated in Fig. 1, to start the three-phase motor 61 for unit C, the attendant at the charging station merely depresses the starting button 68. This closes the single-throw-four-pole relay switch 100 and the motor circuit whereupon the motor continues to operate until the limit switch 67 is actuated, in a manner heretofore explained, to sever said circuit. The attendant at the charging station of the machine, may, however, stop the motor 61 manually and independently of the limit switch by depressing the stop button 71 which also severs the motor circuit of motor 61. The wiring arrangement of the machine is such that when conductors 101 leading to the motor 61 and relay switch 100 of unit C are at the charging end of the machine the terminals 102 of such conductors 101 are brought into contact with the terminals 103 of electric conductors 104, as shown in Fig. 7. It will therefore be apparent that the starting and normal stopping of motor 61 of unit C, when at the charging station will be controlled by limit switch 67 and manual switch button 68, and that when the turret is rotated, terminals 102 of unit C will be brought into contact with terminals 105 whereupon the motor 61 of unit C will then be under the control of the limit switch 67 and switch 92 at the discharge station of the machine. The terminals 102 are therefore preferably carried by the plate member 15 of turret frame 14, while the terminals 103 and 105 are carried by the top plate 12 of the main frame. It will be noted in Fig. 7 that the source of current is supplied through service lines 113 which feed the conductors 114, 115 and 116 respectively, which in turn are electrically connected by suitable conductors to supply current to the relay switches 100 and motors 61—61.

An attendant at the discharging station of the machine may control the rotation of the tire building drum 107 in the usual and well known manner. Inasmuch as this forms no part of the present invention, it will not be described in detail. Furthermore the breaker strips 108 may be withdrawn from a supply roll 109 and passed over idler pulleys 110 so that the leading end of the strips may be presented adjacent the discharging station in a manner to be readily wound upon the tire drum 107 in the customary manner. Also chafer strips 111 may be stored upon a roll 112 suitably mounted for rotation, the strips being supported in the usual and well known manner and having their leading ends presented adjacent the discharging station at approximately the same point as that of the breaker strips.

I claim:

1. In a tire building machine, the combination of a main frame, a turret frame rotatably supported by the main frame, a plurality of stock storing units carried by the turret frame, a motor for each stock storing unit, means for indexing the turret frame and stock storing units respectively, an electric circuit for each motor, and switches for controlling said motor circuits independently of one another characterized in that each switch is arranged to operate the motors successively as the turret frame is rotated upon the main frame.

2. In a tire building machine, the combination of a main frame, a turret frame mounted for rotation thereon, a stock-loading and unloading stations, a strip supply unit mounted upon the turret frame and including a plurality of pairs of storing rolls, and power means for shifting the unit independently to successively present the pairs of rolls to a predetermined position adjacent the loading or unloading stations of the machine, means carried by the main frame adapted to act frictionally on one of the stock storing rolls adjacent the loading station, and subsequently acting means operating consequent upon the shifting of the rolls last mentioned for winding the stock storing rolls after they have passed the respective stations.

3. A strip feeder comprising in combination a support, a stock infeeding station thereon, a member carried by the support and mounted for rotation thereon and having two sets of stock-carrying units, each unit comprising a pair of spaced stock rolls, each pair of rolls being rotatable on the member independently of the movement of the member and independently of the other pairs of rolls, the pairs of rolls of each unit being movable in an endless path, part of which extends above the station at which the stock is fed to the rolls, and means on the support for winding any pair of stock-carrying rolls of either set when such pair is adjacent said station.

4. A strip feeder comprising in combination a main frame, a turret frame carried by the main frame and mounted on a vertical axis for rotation thereon, a stock infeeding station on the turret, spaced stock-carrying units mounted to shift as a unit with reference to the turret frame and each unit comprising a plurality of pairs of rolls with a tape interconnecting the rolls of each pair, and automatic means acting upon each pair of rolls for winding the respective pairs of rolls after they have passed the stock infeeding station and as they are traveling to bring a succeeding empty roll into coaction with said station into position to be loaded therefrom.

5. In a strip feeder, a stock supply unit comprising a plurality of stock supply rolls mounted for movement in an endless path, a stock infeeding station adjacent the supply unit, means for winding supply rolls at the stock infeeding station, and means for automatically winding the last mentioned supply rolls after they have passed the stock infeeding station and as they are traveling to bring a succeeding empty roll into coaction with said station into position to be loaded therefrom.

6. In a strip feeder, a frame, a plurality of stock supply units carried by the frame, each unit comprising a plurality of supply rolls mounted for movement in an endless path, friction rollers on said rolls respectively, a stock infeeding station and a stock withdrawing station adjacent the path of travel of the rolls, and a track adapted to engage said friction rollers on successive rolls for automatically winding the rolls after they have passed the infeeding station.

HENRY C. BOSTWICK.